(12) United States Patent
Holmoy

(10) Patent No.: US 6,581,975 B1
(45) Date of Patent: Jun. 24, 2003

(54) INSULATED BALL JOINT

(75) Inventor: Vidar Holmoy, Tønsberg (NO)

(73) Assignee: Hitec Marine AS, Kolbjornsvik (NO)

( * ) Notice: Subject to any disclaimer, the term of this patent is extended or adjusted under 35 U.S.C. 154(b) by 0 days.

(21) Appl. No.: 09/869,403

(22) PCT Filed: Dec. 28, 1999

(86) PCT No.: PCT/NO99/00405

§ 371 (c)(1),
(2), (4) Date: Aug. 23, 2001

(87) PCT Pub. No.: WO00/39496

PCT Pub. Date: Jul. 6, 2000

(30) Foreign Application Priority Data

Dec. 28, 1998 (NO) .............................. 19986147

(51) Int. Cl.⁷ ................................ F16L 11/12
(52) U.S. Cl. ................. 285/51; 285/146.1; 285/904; 285/261
(58) Field of Search ................. 285/51, 146.1, 285/261, 121.7, 904

(56) References Cited

U.S. PATENT DOCUMENTS

| | | | | |
|---|---|---|---|---|
| 395,671 A | * | 1/1889 | Thayer ................. 285/146.1 X |
| 1,057,939 A | * | 4/1913 | Cooper ................. 285/261 |
| 1,425,635 A | * | 8/1922 | Dod ................. 285/261 X |
| 1,772,547 A | * | 8/1930 | Keese et al. ......... 285/146.1 X |
| 1,821,274 A | * | 9/1931 | Plummer ................. 285/261 X |
| 2,456,744 A | * | 12/1948 | Sjoberg ................. 285/261 |
| 3,860,271 A | * | 1/1975 | Rodgers ................. 285/261 X |
| 3,995,889 A | * | 12/1976 | Carr et al. ............. 285/261 X |
| 4,183,556 A | * | 1/1980 | Schwemmer ................. 285/51 |
| 4,408,785 A | * | 10/1983 | Legros et al. ........... 285/263 X |
| 5,048,873 A | * | 9/1991 | Allread et al. .......... 285/261 X |
| 5,171,042 A | * | 12/1992 | Faidiga ................. 285/51 X |

* cited by examiner

Primary Examiner—Lynne H. Browne
Assistant Examiner—David E. Bochna
(74) Attorney, Agent, or Firm—Pitney, Hardin, Kipp & Szuch LLP

(57) ABSTRACT

System for loading and unloading of cold media, for example LNG or LPG, to or from a vessel, through pipes (1) connected with ball joints, where the pipes are insulated, and when each ball joint's inside part (4) has an inside pipe (3) which is sealed against the inside part (4) substantially over the letter extent, and which thereby forms an inside annulus (6) which can be evacuated, and that each ball joint's outside part (10) is surrounded by an outside annulus (9) which also may be evacuated.

2 Claims, 1 Drawing Sheet

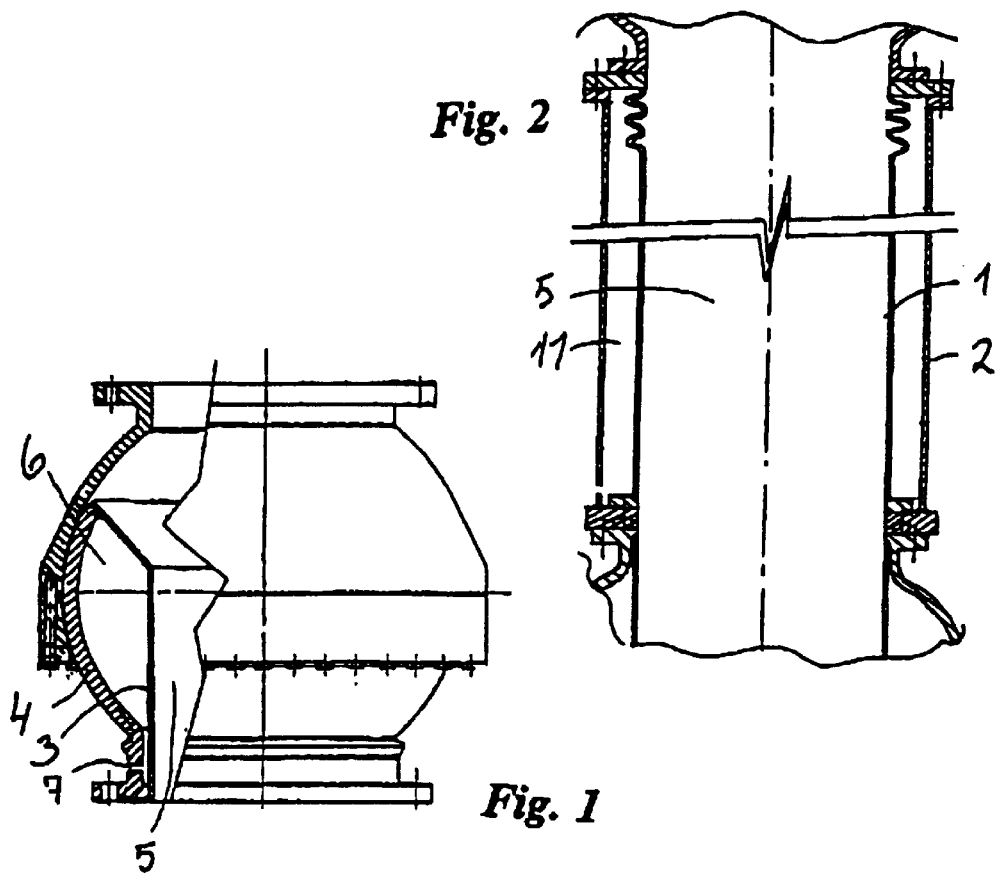

INSULATED BALL JOINT

BACKGROUND OF THE INVENTION

1. Field of the Invention

The present invention relates to a system for loading and unloading of cold media, for example LNG or LPG, to or from a vessel, especially offshore.

2. Description of the Prior Art

Today the loading and unloading of liquid natural gas or other cooled down hydrocarbons take place offshore only as an exception. Wishes to do this offshore are, however, increasingly natural. Floating factories for liquid natural gas, so called LNG, are being planned out on the open ocean. Therefore the need for effective loading system is present.

Such a system is described in Norwegian patent application 1998 1332 which contains descriptions of such loading systems. The loading system itself consists of pipes connected with spherical ball joints. In addition what is described, the solution will be equipped with some type of insulation. This is because the liquid LNG has a temperature of about −162° C. at atmospheric pressure.

This insulation has the task of minimize the loss of energy and the costs in this connection. Further it is important to avoid cold surfaces where sea spray or moisture may form heavy layers of ice. Further task is to avoid that ice is formed of ball joints smooth spherical surfaces. Such ice will be able to hinder the movement and damage the gasket and thereby make the system unusable.

Finally, the insulation should delay boiling if the loading is stopped and pieces of pipe get under water.

Most types of insulation used on ship and in the offshore industries is based on the fact that they contain a gas, usually air, which hinder both heat conduction and heat radiation. But even if the heat radiation through the insulation is small, will heat conduction not be less than the heat conductivity of air.

It is estimated that, if this insulation shall meet the tasks as given above, there is a need for a 140 mm thick layer of insulation. This is problematic, especially for the ball joint, where the insulation must be mounted inside.

The porous material must also be protected against a considerable mechanical wear and hits during various operations. This will further mean problems with being able to dismount and inspect insulation and piping as demanded by classification companies and others.

SUMMARY OF THE INVENTION

The present invention will avoid most of the above disadvantages with known solutions, while it achieves other important advantages.

Accordingly, the present invention is a ball joint coupling apparatus for loading and unloading of cold liquid gas media to or from a vessel through insulated pipes (1) connected with the ball joint coupling apparatus. The invention is characterized in that the ball joint coupling apparatus has an inside part (4) which surrounds an inside pipe (3). The inside pipe (3) is sealed against the inside part (4) substantially over the extent of the inside part (4), thereby forming an inside annulus (6) which is evacuated.

The invention is also characterized in that the ball joint coupling apparatus has an outside part (10) which is surrounded by an outside annulus (9) which is also evacuated.

BRIEF DESCRIPTION OF THE DRAWINGS

FIG. 1 is a plan view, partly in section, of the ball joint of the present invention;

FIG. 2 is a longitudinal section view through a pipe insulated according to the present invention; and FIG. 3 is a plan view, partly in section, of an alternate embodiment of the present invention.

DETAILED DESCRIPTION OF THE PREFERRED EMBODIMENTS

The present invention consists of leading two hollow parts into one another, inside thin part 1 or 3 through which loading media can flow, and a somewhat thicker outside the part 2 or 4. The annulus is sealed in both ends. In this way it is developed a flow passage 5 through the pipes and ball joints and an outside insulating annulus 11 through the pipes, and an outside insulating room 6 around the flow passage 5 through the ball joint. The insulating annulus 6 and 11 are evacuated through passage 7 when loading and unloading take place. Such a system is easy to apply offshore.

The parts will be hollow, that they are all having an inside flow-through passage 5 or a surrounding annulus 6 or 11. The construction may be for example as shown with the ball joints on FIG. 1 and the pipe on FIG. 2. The pipe may typically have a length of 8 meters. Typical inside diameter for ball join may be 200 till 600 mm. The shaping of the ball joint will be such that the heat flow from the ball joint's inside part 4 to the loading medium will be low. This will eliminate the problems with ice forming and damage on gaskets because the ball surface is warmer than 0° C.

At loading it may be a great temperature differences between outside and inside parts. The thermal tension for straight pipes are drastically reduced by the fact that there is a built in section 8 in the loading pipe which is flexible in axial direction. This will have an adequate forming and dimensioning to be able to withstand actual loading and exhausting strains.

The air space between the pipes has an insulating effect. But the insulating ability will be better than other methods only when the air in between is sucked out through a valve. The insulating ability will then be independent of the thickness of the air space. This will substantially limit the ball joints dimensions.

The heat conduction will stop simply because there are no molecules that transport the heat. Heat radiation is also modest at low temperature, and is dependent on the surfaces, so that these should be treated with a lacquer or other material gives a low emissivity.

Insulation method is not a part of the invention. It was invented by Sir James Dewer in the last century, add is being used for example in thermos bottles and for storing of liquid air in so-called Dewar-containers. The inventor does not know that the method is being applied on ball joints, pipe parts or such loading systems as described here.

With the insulated pipes and ball joints according to the present invention, one achieve very slight energy losses at loading, without any risk for intense boiling if the loading stops, and there are plus degrees on the outside of both the pipes and the ball joints, and there are no problems with ice forming.

Further according to the invention, there is also achieved a separation of the elements that receive impacts and take up outside forces, from the pipe that transfer the "dangerous" medium. This is the most correct with respect to the risk for brake and leakages.

Insulated pipes and ball joints according to the invention also make it possible a quick cooling down of the pipe system without great temperature stresses in the piping walls. Low building costs, long limetime and simple inspection of all parts are other important advantages with the invention.

If gas should leak into the strength pipe and the insulating ability is reduced, will this be visible by the formings of frost on the outside. This provides a system with an extra security.

As shown on FIG. 3, a ball joint may include both an inside annulus 6 inside the ball joint's inner part 4 and an outside annulus 9 outside the ball joint's outer part 10, since both the outside and the inside annulus is adapted to be evacuated, in order to achieve an optimal insulation of the ball joints against the surroundings.

What is claimed is:

1. A ball joint coupling apparatus for loading and unloading of cold liquid gas media to or from a vessel through pipes (1) connected with said ball joint coupling apparatus, where the pipes are insulated, characterized in that said ball joint coupling apparatus has an inside pipe (3) and an inside part (4), said inside part (4) surrounding said inside pipe (3), said inside pipe (3) being sealed against the inside part (4) substantially over the extent of the inside part (4), thereby forming an inside annulus (6), said inside annulus (6) being evacuated, and in that said ball joint coupling apparatus has an outside part (10), said outside part (10) being surrounded by an outside annulus (9), said outside annulus (9) also being evacuated.

2. A ball joint coupling apparatus as claimed in claim 1, characterized in that said inside part (4) is effectively insulated against said cold liquid gas media such that the temperatures of said inside and outside parts (4,10) may be different from the temperature of said cold liquid gas media.

* * * * *